(12) United States Patent
Lai et al.

(10) Patent No.: US 12,300,443 B2
(45) Date of Patent: May 13, 2025

(54) CAPACITANCE VALUE FAST-PLACING VACUUM CAPACITOR

(71) Applicant: KUNSHAN GUOLI ELECTRONIC TECHNOLOGY CO., LTD., Suzhou (CN)

(72) Inventors: Pingnan Lai, Suzhou (CN); Shushu Wang, Suzhou (CN); Ming Cao, Suzhou (CN); Enyao Qin, Suzhou (CN); Bin Hu, Suzhou (CN); Jose Ignacio Frias Betancourt, Suzhou (CN)

(73) Assignee: KUSHAN GUOLI ELECTRONIC TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/782,989

(22) Filed: Jul. 24, 2024

(65) Prior Publication Data

US 2024/0379294 A1    Nov. 14, 2024

Related U.S. Application Data

(63) Continuation of application No. PCT/CN2023/080984, filed on Mar. 13, 2023.

(30) Foreign Application Priority Data

May 30, 2022  (CN) .......................... 202210601616.9

(51) Int. Cl.
*H01G 5/14* (2006.01)
*H01G 5/00* (2006.01)
*H01G 5/014* (2006.01)

(52) U.S. Cl.
CPC .............. *H01G 5/145* (2013.01); *H01G 5/014* (2013.01); *H01G 2005/02* (2013.01)

(58) Field of Classification Search
CPC ....... H01G 5/14; H01G 2005/02; H01G 5/145
See application file for complete search history.

(56) References Cited

U.S. PATENT DOCUMENTS 2,192,062 A  *  2/1940  Clarence ................. H01G 4/02
                                                        361/290

FOREIGN PATENT DOCUMENTS

CN       113764188 A  * 12/2021  ............. H01G 5/014
KR       101598889 B1 *  3/2016
(Continued)

*Primary Examiner* — David M Sinclair
(74) *Attorney, Agent, or Firm* — Westbridge IP LLC

(57) ABSTRACT

A capacitance value fast-placing vacuum capacitor includes: a housing, a first electrode group and a second electrode group. A vacuum chamber is provided in the housing. The first electrode group and the second electrode group are mutually coupled and accommodated in the vacuum chamber. An electromagnetic drive mechanism is mounted on the outer side of one end of the housing. The electromagnetic drive mechanism is capable of driving the first electrode group to shift relative to the second electrode group, the vacuum capacitor is switched between two capacitance value states. In the capacitance value rapid-switching vacuum capacitor, the electromagnetic drive mechanism is configured for rapidly adjusting and switching capacitance values of the vacuum capacitor, the capacitance value switching time of the vacuum capacitor is within one hundred milliseconds, thus meeting the requirement of an application device of the vacuum capacitor for rapid matching of an impedance matcher.

17 Claims, 5 Drawing Sheets

(56) References Cited

FOREIGN PATENT DOCUMENTS

| SU | 746576 A1 | * | 7/1980 | |
|----|-----------|---|--------|--|
| WO | WO-0129853 A1 | * | 4/2001 | ............... H01G 5/14 |
| WO | 2016122174 A1 | | 8/2016 | |

* cited by examiner

CAPACITANCE VALUE FAST-PLACING VACUUM CAPACITOR

CROSS-REFERENCE TO RELATED APPLICATIONS

This application is a continuation of International Application No. PCT/CN2023/080984, filed on Mar. 13, 2023, which claims priority to Chinese Patent Application No. 202210601616.9, filed on May 30, 2022. All of the aforementioned applications are incorporated herein by reference in their entireties.

TECHNICAL FIELD

The disclosure relates to the technical field of capacitors, in particular to a capacitance value fast-placing vacuum capacitor.

BACKGROUND

A vacuum capacitor is a capacitor with a ceramic insulation shell, a vacuum medium, and a high-conductivity oxygen-free copper electrode. Compared with other capacitors, the vacuum capacitor has the characteristics of high withstand voltage, large load current, low high-frequency loss, and self-healing after instantaneous overload, and is especially suitable for the field of high-frequency and high-voltage applications. The vacuum capacitor is widely applied to broadcasting, medical nuclear magnetic resonance, high-frequency heating, semiconductor etching plasma cleaning, and other devices. The vacuum capacitor forms a resonant circuit with a high-frequency inductor in these high-frequency devices to complete high-frequency impedance matching, thereby realizing stable transmission of radio frequency power.

A traditional variable ceramic vacuum capacitor generally uses a thread system to adjust a capacitance value range. As shown in FIG. 1, a moving electrode group 21 of the traditional variable ceramic vacuum capacitor is connected to a rotating screw rod 23. The rotating screw rod 23 is connected to a control motor 24. The control motor 24 drives the rotating screw rod 23 to rotate. The moving electrode group 21 moves up and down with the clockwise or counterclockwise rotation of the rotating screw rod 23. A coupling length between the moving electrode group 21 and an electrostatic electrode group 22 is changed, a coupling area between two groups of electrodes is changed, and a capacitance value of the capacitor is changed accordingly, thereby realizing the adjustment of the capacitance value of the variable capacitor.

The mechanical life and adjusting speed of the variable capacitor are limited by a thread specification, materials of rotating parts and a surface state thereof. Due to the influence of a difference between internal and external pressures of the vacuum capacitor on the rotating screw rod 23, the torque of the rotating screw rod 23 is generally greater than 0.1 N·m. Under the condition that the torque of the control motor 24 is fixed, the rotating speed of the rotating screw rod 23 cannot be improved. Therefore, the capacity adjusting speed of the capacitor is also limited. The adjusting speed of the traditional variable ceramic vacuum capacitor is generally 600 rpm, and the adjusting time of the traditional variable ceramic vacuum capacitor from a maximum capacity position to a minimum capacity position (maximum working stroke) is usually 3 to 6 seconds.

With the continuous improvement of the matching speed and matching accuracy of an application device of the vacuum variable capacitor for an impedance matcher, users require a higher capacitance value adjusting speed of the variable ceramic vacuum capacitor and a shorter adjusting time of the maximum working stroke. Therefore, it is necessary to improve the prior art to overcome the limitations in the prior art.

SUMMARY

In order to solve the technical problem, the disclosure provides a capacitance value fast-placing vacuum capacitor, which can effectively shorten the capacitance value adjusting time of the vacuum capacitor and improve the capacitance value adjusting speed.

In order to solve the technical problem, the disclosure adopts the following technical solution. A capacitance value fast-placing vacuum capacitor includes: a housing, a first electrode group and a second electrode group. A vacuum chamber is provided in the housing. The first electrode group and the second electrode group are mutually coupled and accommodated in the vacuum chamber. An electromagnetic drive mechanism is mounted on the outer side of one end of the housing. The electromagnetic drive mechanism is capable of driving the first electrode group to shift relative to the second electrode group, so that the vacuum capacitor can be placed or changed between two capacitance value states.

As a further improvement of the disclosure, a magnetic conductive plate is fixedly connected to the first electrode group. When the electromagnetic drive mechanism is energized, an attraction force can be generated on the magnetic conductive plate, and the magnetic conductive plate is driven to drive the first electrode group to move in a direction away from the second electrode group.

As a further improvement of the disclosure, the electromagnetic drive mechanism includes an iron core and a coil winding arranged around the iron core. The iron core and the magnetic conductive plate are arranged oppositely. A magnetic field generated when the coil winding is energized magnetizes the iron core, so that the magnetic conductive plate is attracted onto the iron core.

As a further improvement of the disclosure, the first electrode group includes a first rotor disc and a first electrode fixed on one side of the first rotor disc. A pull rod is fixed on the other side of the first rotor disc. The magnetic conductive plate is arranged on the outer side of the housing, and is fixedly connected to the first electrode group through the pull rod.

As a further improvement of the disclosure, a limiting stop is arranged on the end of the pull rod penetrating through and exposed from the housing. When the electromagnetic drive mechanism is deenergized, the first electrode group always has a tendency to move toward the second electrode group under the force of a difference between internal and external pressures of the vacuum capacitor, so that the limiting stop stops on an end surface of the housing.

As a further improvement of the disclosure, a first bellows is hermetically connected between the other side of the first rotor disc and an inner wall of the housing, and the first bellows is sleeved on the outer side of the pull rod.

As a further improvement of the disclosure, the second electrode group is fixedly connected to the inner wall of the housing.

As a further improvement of the disclosure, an adjusting mechanism is mounted on the outer side of the other end of the housing. The second electrode group is movably arranged in the vacuum chamber and connected to the adjusting mechanism. The adjusting mechanism is configured to adjust a position of the second electrode group in the vacuum chamber to change a coupling area between the second electrode group and the first electrode group.

As a further improvement of the disclosure, the second electrode group includes a second rotor disc and a second electrode fixed on one side of the second rotor disc. A screw rod is fixed on the other side of the second rotor disc. The adjusting mechanism includes an adjusting nut. The adjusting nut is threaded on the end of the screw rod penetrating through and exposed from the housing.

As a further improvement of the disclosure, a second bellows is hermetically connected between the other side of the second rotor disc and the inner wall of the housing, and the second bellows is sleeved on the outer side of the screw rod.

The disclosure achieves the following beneficial effects.

Firstly, the disclosure provides a capacitance value fast-placing vacuum capacitor. An electromagnetic drive mechanism is configured for fast adjusting and changing capacitance values of the vacuum capacitor. By controlling the on-off of a power supply, a coil winding is controlled to magnetize an iron core to generate an attraction force, so as to drive a magnetic conductive plate to drive a first electrode group to shift relative to a second electrode group, thereby changing a mutual coupling area of two groups of electrodes and realizing the rapid changing of the capacitance values. Therefore, the capacitance value change time of the vacuum capacitor is within one hundred milliseconds, thus meeting the requirement of an application device of the vacuum capacitor for rapid matching of an impedance matcher.

Lastly, in the disclosure, the second electrode group is also set to be adjustable, and a position of the second electrode group is adjusted by an adjusting mechanism, so that a first capacitance value and a second capacitance value of the vacuum capacitor can be changed. Further, the adjustment of the two-way capacitance values is realized, so that the vacuum capacitor is not limited to placing or changing between two fixed capacitance value states, thus meeting the use requirement of a user, and facilitating the use by the user.

DETAILED DESCRIPTION OF THE EMBODIMENTS

A preferred embodiment of the disclosure is described in detail below with reference to the accompanying drawings.

Embodiment 1

Figure 2:
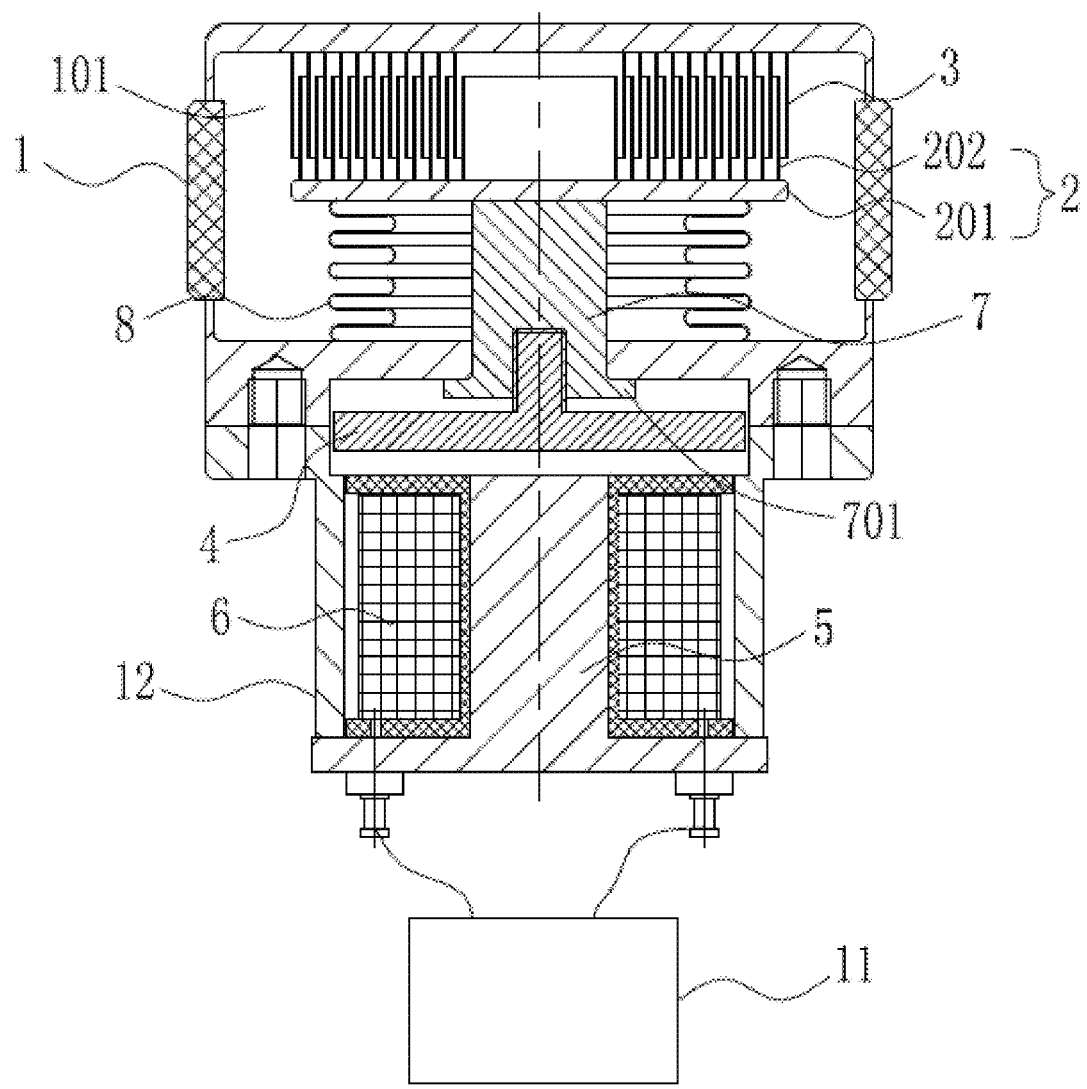
FIG. 2 is a cross-sectional view of a capacitance value fast-placing vacuum capacitor according to Embodiment 1 of the disclosure.
Figure 3:
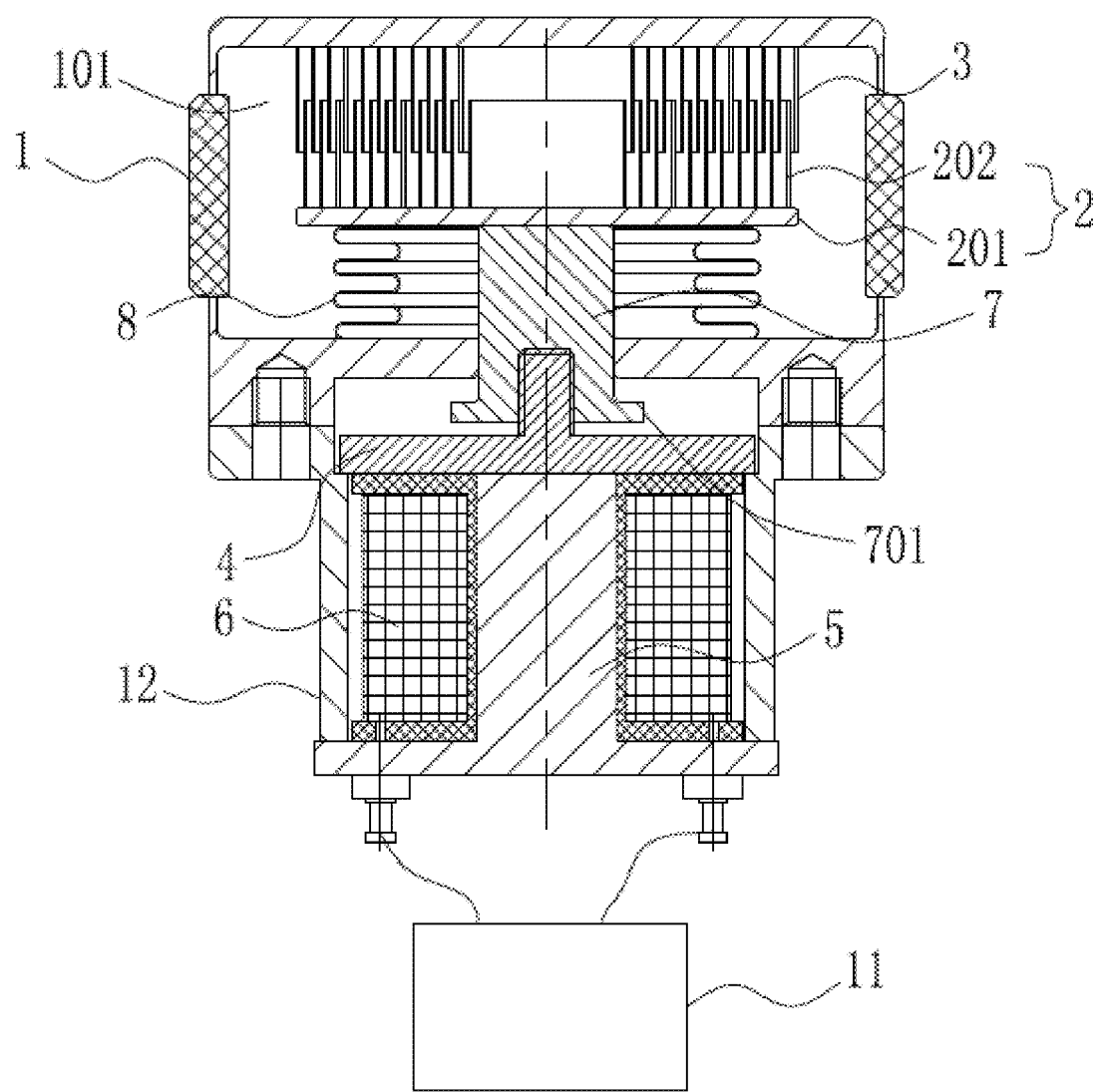
FIG. 3 is a cross-sectional view of a capacitance value-placed capacitance value fast-placing vacuum capacitor according to Embodiment 1 of the disclosure.

Referring to FIG. 2 and FIG. 3, the disclosure provides a capacitance value fast-placing vacuum capacitor, including: a housing 1, a first electrode group 2, a second electrode group 3, and an electromagnetic drive mechanism. The housing 1 is composed of a porcelain tube, an end cover and a mounting plate. The end cover is hermetically and fixedly connected to the top of the porcelain tube by welding or brazing, and the mounting plate is hermetically and fixedly connected to the bottom of the porcelain tube by welding or brazing, so that the housing 1 has high insulation performance and high medium withstand voltage, and can ensure a high vacuum environment in the capacitor.

A vacuum chamber 101 is provided in the housing 1, and the first electrode group 2 and the second electrode group 3 are mutually coupled and accommodated in the vacuum chamber 101. Specifically, the first electrode group 2 is a moving electrode group, including a first rotor disc 201 and a first electrode 202. The first electrode 202 is fixedly connected to an upper side surface of the first rotor disc 201. The first electrode 202 is composed of a plurality of electrode rings nested concentrically within each other. The second electrode group 3 is a static electrode group, fixedly connected to an inner top wall of the end cover of the housing 1. The second electrode group 3 is also composed of a plurality of electrode rings nested concentrically within each other. The coupling portion of the first electrode group 2 and the second electrode group 3 is a charge storage unit composed of two groups of electrode bands.

Referring to FIG. 2, the electromagnetic drive mechanism is mounted on the outer side of a bottom end of the mounting plate of the housing 1, and the electromagnetic drive mechanism is capable of driving the first electrode group 2 to shift relative to the second electrode group 3, so that the vacuum capacitor can be placed or changed between two capacitance value states.

Specifically, a magnetic conductive plate 4 is fixedly connected to the first electrode group 2. When the electromagnetic drive mechanism is energized, an attraction force can be generated on the magnetic conductive plate 4, and the magnetic conductive plate 4 is driven to drive the first electrode group 2 to move in a direction away from the second electrode group 3. A pull rod 7 is fixedly mounted on a lower side surface of the first rotor disc 201, and a lower end of the pull rod 7 penetrates out of and is exposed from the mounting plate of the housing 1. The magnetic conductive plate 4 is arranged below the housing 1, and the magnetic conductive plate 4 is fixedly connected to the first electrode group 2 through the pull rod 7. A screw hole is provided axially at the lower end of the pull rod 7. A stud is arranged axially at a top end of the magnetic conductive plate 4. The magnetic conductive plate 4 is fixedly connected to the interior of the screw hole through the stud.

In order to ensure a vacuum environment inside the housing 1, a first bellows 8 is hermetically welded or brazed between the lower side surface of the first rotor disc 201 and an inner wall of the mounting plate of the housing 1. The first bellows 8 is sleeved on the outer side of the pull rod 7. The first bellows 8 is made of stainless steel, can be elastically deformed, compressed or stretched following the up and down movement of the first electrode group 2, and has a long mechanical life.

Further, an annular limiting stop 701 is arranged at the lower end of the pull rod 7 that penetrates through and is exposed from the housing 1. The exterior of the first bellows 8 is located in the vacuum chamber 101, the interior of the first bellows 8 is communicated with an external environment of the vacuum capacitor, and the pressure of the first bellows is greater than the pressure of the vacuum chamber 101. Therefore, when the electromagnetic drive mechanism is in a deenergized state, the first electrode group 2 always has a tendency to move toward the second electrode group 3 under the force of a difference between internal and external pressures of the vacuum capacitor, so that the limiting stop 701 stops upward on an end surface of the housing 1.

Since a motion mating member is located outside the vacuum chamber 101 in this embodiment, lubricating grease may be added to ensure smooth and steady movement.

Referring to FIG. 2 again, the electromagnetic drive mechanism includes an iron core 5, a coil winding 6 and a shielding shell 12. The shielding shell 12 is fixedly mounted at the bottom of the mounting plate of the housing 1, and an accommodation cavity is formed between the shielding shell 12 and the housing 1. The magnetic conductive plate 4 is movable up and down in the accommodation cavity. The coil winding 6 is accommodated in an inner cavity of the shielding shell 12, and the shielding shell 12 shields the coil winding 6 so that the coil winding 6 is not affected by a high-frequency current. The iron core 5 has a T-shaped cross section, and is provided with a fixing plate and a cylindrical adsorption end integrated with the fixing plate. The fixing plate is configured to be fixed at the bottom end of the shielding shell 12. The adsorption end extends upward into the inner cavity of the shielding shell 12 and is opposite to the magnetic conductive plate 4. The coil winding 6 is arranged around the adsorption end of the iron core 5, and two terminals of the coil winding 6 are drawn outward through the fixing plate and electrically connected to a power supply 11.

The working principle of this embodiment is that when the coil winding 6 is connected to the power supply 11, the coil winding 6 generates a magnetic field to magnetize the iron core 5, the magnetic conductive plate 4 moves downward and is attracted onto the iron core 5 under the action of an attraction force, and the first electrode group 2 is synchronously pulled to move downward by the pull rod 7, so that a coupling length between the first electrode group 2 and the second electrode group 3 is reduced, a coupling area of two groups of electrodes is reduced, the capacitance value of the capacitor is reduced, and the vacuum capacitor is in a first capacitance value state (as shown in FIG. 3). When the coil winding 6 is disconnected from the power supply 11, a magnetic force of the iron core 5 disappears, and the magnetic conductive plate 4 moves upward under the force of the difference between the internal and external pressures of the vacuum capacitor and the elastic force of the first bellows 8, until the limiting stop 701 of the pull rod 7 stops upward on the end surface of the housing 1. The first electrode group 2 is synchronously pulled to move upward by the pull rod 7, the coupling length between the first electrode group 2 and the second electrode group 3 is increased, the coupling area of the two groups of electrodes is increased, the capacitance value of the capacitor is increased, and the vacuum capacitor is in a second capacitance value state (as shown in FIG. 2).

It is to be noted that by configuring the distance between the iron core 5 and the magnetic conductive plate 4, it is possible to adjust a movement distance of the first electrode group 2, namely from a maximum capacity position of the vacuum capacitor to a minimum capacity position, so as to adjust the sizes of the first capacitance value and the second capacitance value of the capacitor.

It can be seen that in this embodiment, the electromagnetic drive mechanism is configured for fast adjusting and changing of capacitance values of the vacuum capacitor. By controlling the on-off of the power supply 11, the coil winding 6 is controlled to magnetize the iron core 5 to generate an attraction force, so as to drive the magnetic conductive plate 4 to drive the first electrode group 2 to shift relative to the second electrode group 3, thereby changing a mutual coupling area of two groups of electrodes and realizing the fast placing or change of the capacitance values. Therefore, the capacitance value change time of the vacuum capacitor is within one hundred milliseconds, thus meeting the requirement of an application device of a variable capacitor for rapid matching of a matcher.

Embodiment 2

Figure 4:
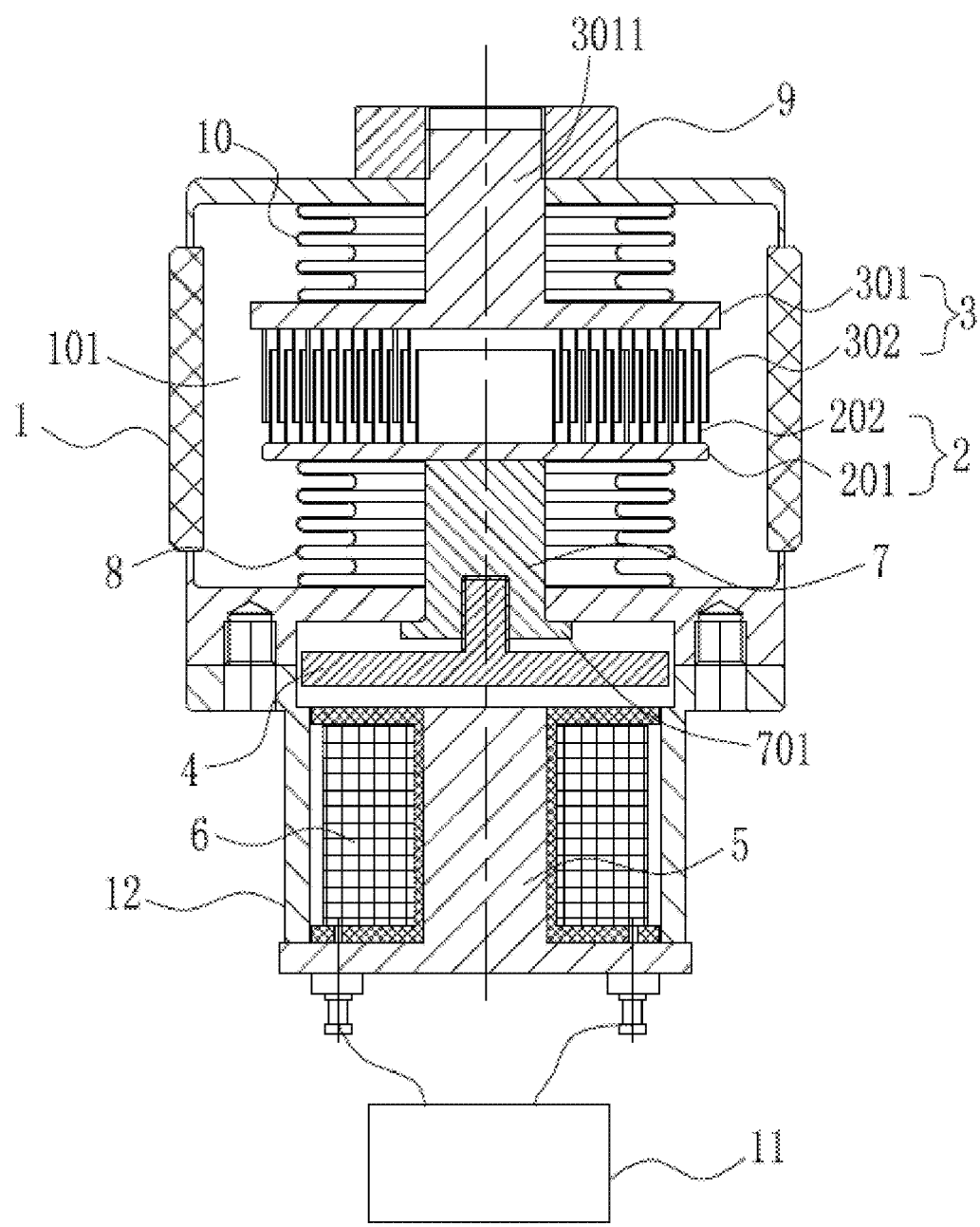
FIG. 4 is a cross-sectional view of a capacitance value fast-placing vacuum capacitor according to Embodiment 2 of the disclosure.
Figure 5:
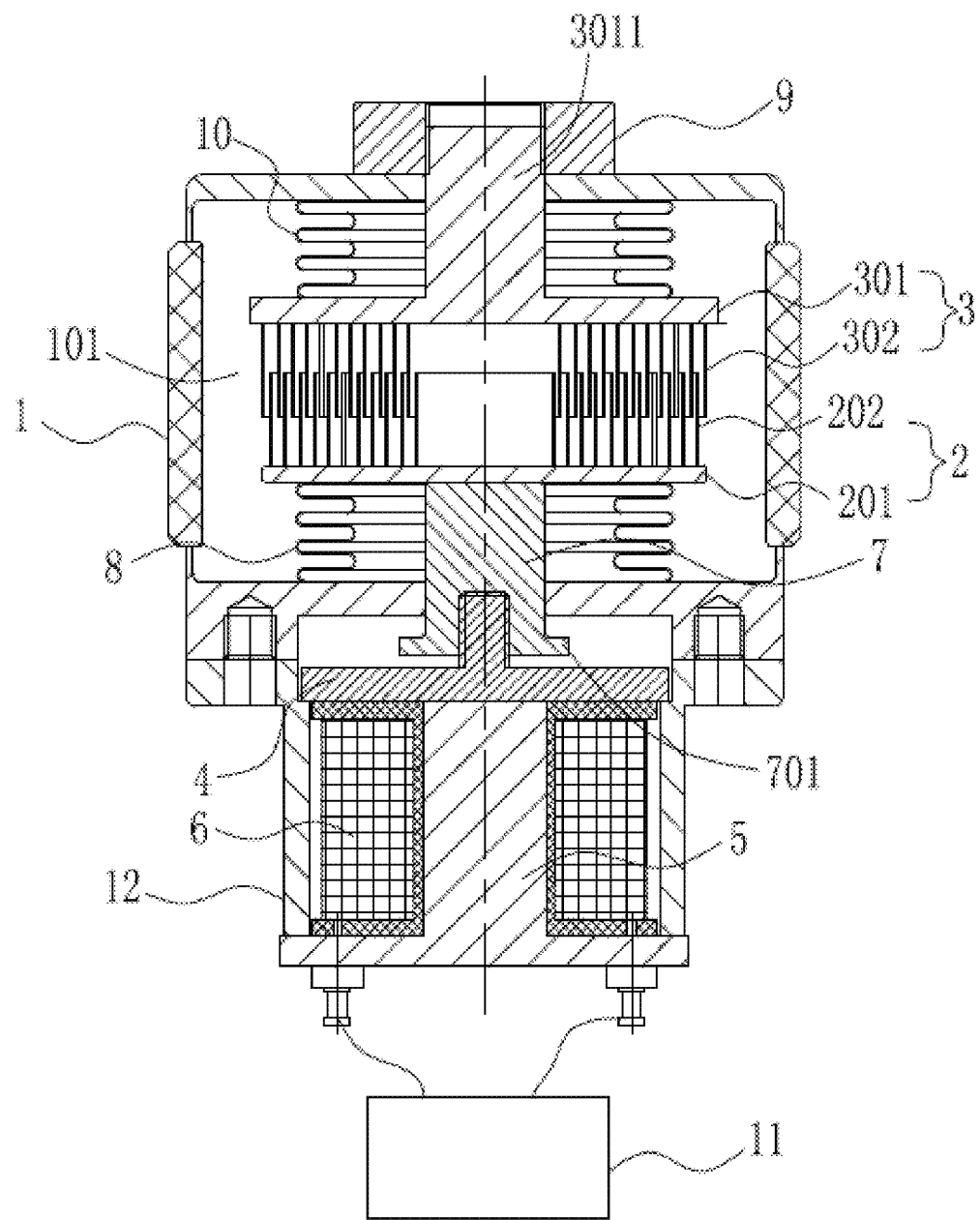
FIG. 5 is a cross-sectional view of a capacitance value-placed capacitance value fast-placing vacuum capacitor according to Embodiment 2 of the disclosure.

Referring to FIG. 4 and FIG. 5, the difference between this embodiment and Embodiment 1 is that the second electrode group 3 can also serve as a moving electrode group to shift in the vacuum chamber 101 so as to change the position in this embodiment. An adjusting mechanism is mounted on the outer side of the top end of the end cover of the housing 1. The second electrode group 3 is movably arranged in the vacuum chamber 101 and connected to the adjusting mechanism. The adjusting mechanism is configured to adjust the position of the second electrode group 3 in the vacuum chamber 101 to change the coupling area between the second electrode group 3 and the first electrode group 2.

Specifically, referring to FIG. 4, the second electrode group 3 includes a second rotor disc 301 and a second electrode 302. The second rotor disc 301 is arranged over the first rotor disc 201. The second electrode 302 is fixedly connected to a lower side surface of the second rotor disc 301 and coupled to the first electrode 202. A screw rod 3011 is arranged axially on an upper side surface of the second rotor disc 301, and the screw rod 3011 penetrates upward through and is exposed from the top of the end cover of the housing 1.

Similarly, in order to ensure the vacuum environment inside the housing 1, a second bellows 10 is hermetically connected between the upper side surface of the second rotor disc 301 and the inner top wall of the end cover of the housing 1. The second bellows 10 is sleeved on the outer side of the screw rod 3011. The second bellows 10 has the same structure as the first bellows 8, is made of stainless steel, and can be elastically deformed, compressed or stretched following the up and down movement of the second electrode group 3.

In this embodiment, the adjusting mechanism includes an adjusting nut 9. The adjusting nut 9 is arranged on the upper end surface of the end cover of the housing 1, and threaded on the top end of the screw rod 3011 exposed from the housing 1. By rotating the adjusting nut 9 in cooperation with the screw rod 3011, the second electrode group 3 may be moved up and down, and the coupling area with the first electrode group 2 may be changed, thereby changing the capacitance value of the capacitor.

It can be seen that in this embodiment, the second electrode group 3 is also set to be adjustable, so that the vacuum capacitor is not limited to placing or changing between two fixed capacitance value states. The position of the second electrode group 3 is adjusted by the adjusting mechanism, so that the first capacitance value and the second capacitance value of the vacuum capacitor can be changed, and the adjustment of the two-way capacitance values of the vacuum capacitor is realized, thus meeting the use requirement of a user, and facilitating the use by the user.

Figure 1:
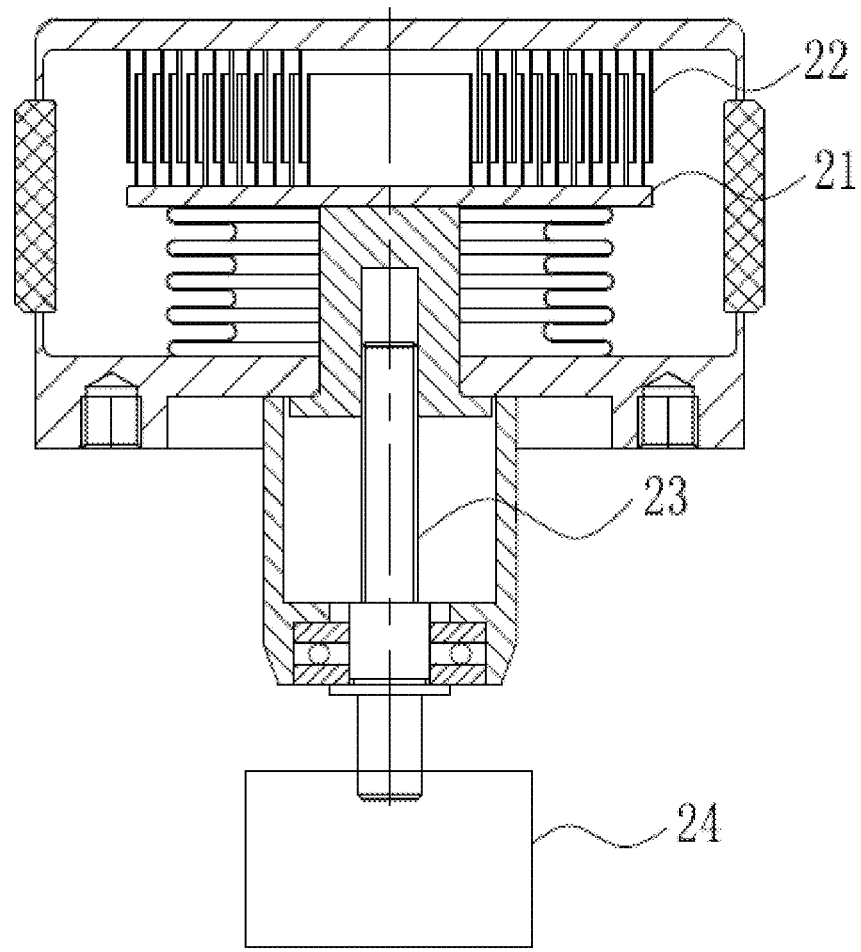
FIG. 1 is a cross-sectional view of an existing variable vacuum capacitor.

It is worth mentioning that although the adjusting mechanism performs adjustment manually by the adjusting nut 9 in this embodiment, it is possible to electrically adjust the second electrode group 3 by the control motor 24 as shown in FIG. 1, but it is necessary to construct the structure of the second electrode group 3 and the adjusting mechanism as shown in FIG. 1, which will not be described in detail.

Many specific details have been set forth in the above description to facilitate a full understanding of the disclosure. However, the above description is only a preferred embodiment of the disclosure, which can be implemented in many other ways different from those described herein. Therefore, the disclosure is not limited by the specific implementations disclosed above. At the same time, any person skilled in the art can use the method and technical content disclosed above to make many possible changes and modifications to the technical solution of the disclosure, or modify the technical solution into equivalent embodiments that are equivalent to changes without departing from the scope of the technical solution of the disclosure. Any simple modifications, equivalent changes and modifications made to the above embodiments according to the technical essence of the disclosure that are not divorced from the content of the technical solution of the disclosure still belong to the scope of protection of the technical solution of the disclosure.

What is claimed is:

1. A capacitance value fast-placing vacuum capacitor, comprising: a housing, a first electrode group and a second electrode group, wherein
a vacuum chamber is provided in the housing, and the first electrode group and the second electrode group are mutually coupled and accommodated in the vacuum chamber;
an electromagnetic drive mechanism is mounted on an outer side of one end of the housing, and the electromagnetic drive mechanism is capable of driving the first electrode group to shift relative to the second electrode group, so that the vacuum capacitor is capable of placing or changing between two capacitance value states;
when the electromagnetic drive mechanism is energized, the electromagnetic drive mechanism is capable of driving the first electrode group to move in a direction away from the second electrode group, so that the vacuum capacitor is capable of placing or changing from a second capacitance value state to a first capacitance value state; and
when the electromagnetic drive mechanism is deenergized, the first electrode group moves toward the second electrode group under a force of a difference between internal and external pressures of the vacuum capacitor, so that the vacuum capacitor is capable of placing or changing from the first capacitance value state back to the second capacitance value state;
wherein a position of the second electrode group in the vacuum chamber is adjustable.

2. The capacitance value fast-placing vacuum capacitor according to claim 1, wherein the first electrode group comprises a first rotor disc and a first electrode; the first electrode is fixed on one side of the first rotor disc, and a retractable first bellows is hermetically connected between an other side of the first rotor disc and an inner wall of the housing; an exterior of the first bellows is located in the vacuum chamber, an interior of the first bellows is communicated with an external environment of the vacuum capacitor, and a pressure of the first bellows is greater than a pressure of the vacuum chamber; and then, when the electromagnetic drive mechanism is in a deenergized state, the first electrode group always has a tendency to move toward the second electrode group under the force of the difference between the internal and external pressures of the vacuum capacitor.

3. The capacitance value fast-placing vacuum capacitor according to claim 2, wherein a pull rod is fixed on the other side of the first rotor disc, and the first bellows is sleeved on an outer side of the pull rod.

4. The capacitance value fast-placing vacuum capacitor according to claim 3, wherein one end of the pull rod penetrates out of and is exposed from the housing, and a limiting stop is arranged on an exposed end of the pull rod; and when the electromagnetic drive mechanism is in the deenergized state, the first electrode group allows the limiting stop to stop on an end surface of the housing under the force of the difference between the internal and external pressures of the vacuum capacitor.

5. The capacitance value fast-placing vacuum capacitor according to claim 3, wherein a magnetic conductive plate is fixedly connected to the first electrode group through the pull rod, and the magnetic conductive plate is arranged on an outer side of the housing; when the electromagnetic drive mechanism is energized, a magnetic attraction force is generated on the magnetic conductive plate; and then, the magnetic conductive plate is driven to drive, through the pull rod, the first electrode group to move in the direction away from the second electrode group.

6. The capacitance value fast-placing vacuum capacitor according to claim 5, wherein a screw hole is provided on one end of the pull rod, a stud is arranged on the magnetic conductive plate, and the magnetic conductive plate is fixedly connected to the screw hole through the stud.

7. The capacitance value fast-placing vacuum capacitor according to claim 5, wherein the electromagnetic drive mechanism comprises an iron core and a coil winding arranged around the iron core; the iron core and the magnetic conductive plate are arranged oppositely; and a magnetic field generated when the coil winding is energized is capable of magnetizing the iron core, so that the magnetic conductive plate is attracted onto the iron core and then the vacuum capacitor is capable of placing or changing to the first capacitance value state.

8. The capacitance value fast-placing vacuum capacitor according to claim 7, wherein the electromagnetic drive mechanism further comprises a shielding shell; the shielding shell is fixedly mounted on the housing; and the coil winding is accommodated in an inner cavity of the shielding shell.

9. The capacitance value fast-placing vacuum capacitor according to claim 8, wherein an accommodation cavity is formed between the shielding shell and the housing, and the magnetic conductive plate is movable up and down in the accommodation cavity.

10. The capacitance value fast-placing vacuum capacitor according to claim 8, wherein the iron core is provided with a fixing plate and an adsorption end; the fixing plate is fixedly connected to one end of the shielding shell; and the adsorption end extends into an inner cavity of the shielding shell and is opposite to the magnetic conductive plate.

11. The capacitance value fast-placing vacuum capacitor according to claim 10, wherein the adsorption end is cylindrical and integrally connected to the fixing plate, so that a cross section of the iron core is T-shaped.

12. The capacitance value fast-placing vacuum capacitor according to claim 10, wherein the coil winding is arranged around the adsorption end, and two terminals of the coil winding are drawn outward through the fixing plate and electrically connected to a power supply.

13. The capacitance value fast-placing vacuum capacitor according to claim 1, wherein an adjusting mechanism is mounted on an outer side of another end of the housing; the second electrode group is movably arranged in the vacuum chamber and connected to the adjusting mechanism; and the adjusting mechanism is configured to adjust the position of the second electrode group in the vacuum chamber to change a coupling area between the second electrode group and the first electrode group.

14. The capacitance value fast-placing vacuum capacitor according to claim 13, wherein the second electrode group comprises a second rotor disc and a second electrode; the second electrode is fixed on one side of the second rotor disc, and a screw rod is arranged on an other side of the second rotor disc; and one end of the screw rod penetrates out of and is exposed from the housing.

15. The capacitance value fast-placing vacuum capacitor according to claim 14, wherein the adjusting mechanism comprises an adjusting nut; the adjusting nut is threaded on an end of the screw rod exposed from the housing; and the adjusting nut is capable of driving the screw rod to drive the second electrode group to move when rotated.

16. The capacitance value fast-placing vacuum capacitor according to claim 14, wherein a retractable second bellows is hermetically connected between the other side of the second rotor disc and the inner wall of the housing, and the second bellows is sleeved on an outer side of the screw rod.

17. The capacitance value fast-placing vacuum capacitor according to claim 1, wherein the housing comprises a porcelain tube, an end cover and a mounting plate, and the end cover and the mounting plate are fixedly connected to both ends of the porcelain tube by welding or brazing, respectively.

* * * * *